(12) United States Patent
Kaabouch et al.

(10) Patent No.: US 8,213,612 B2
(45) Date of Patent: Jul. 3, 2012

(54) SECURE SOFTWARE DOWNLOAD (75) Inventors: Majid Kaabouch, Rousset (FR); Alexandre Croguennec, Aix en Provence (FR); Eric Le Cocquen, Saint Maximin la Sainte Beaume (FR)

(73) Assignee: Inside Contactless S.A., Aix-en-Provence (FR)

( * ) Notice: Subject to any disclaimer, the term of this patent is extended or adjusted under 35 U.S.C. 154(b) by 769 days.

(21) Appl. No.: 11/952,880

(22) Filed: Dec. 7, 2007

(65) Prior Publication Data
US 2009/0150681 A1 Jun. 11, 2009

(51) Int. Cl.
G06F 21/00 (2006.01)
G06F 11/30 (2006.01)
G06F 12/14 (2006.01)
H04L 9/00 (2006.01)

(52) U.S. Cl. ........... 380/47; 713/189; 713/190; 380/277
(58) Field of Classification Search .................. None
See application file for complete search history.

(56) References Cited

U.S. PATENT DOCUMENTS

| | | | |
|---|---|---|---|
| 4,440,976 A * | 4/1984 | Bocci et al. .................... | 380/277 |
| 6,292,874 B1 | 9/2001 | Barnett | |
| 6,970,565 B1 | 11/2005 | Rindsberg | |
| 7,203,842 B2 | 4/2007 | Kean | |
| 7,213,268 B2 | 5/2007 | Stelling | |
| 2003/0123665 A1* | 7/2003 | Dunstan et al. ............... | 380/255 |
| 2005/0039030 A1* | 2/2005 | Rodgers et al. ............... | 713/189 |
| 2005/0131832 A1* | 6/2005 | Fransdonk ...................... | 705/59 |
| 2006/0188099 A1 | 8/2006 | Kondo et al. | |
| 2007/0025594 A1 | 2/2007 | Han et al. | |
| 2007/0083491 A1 | 4/2007 | Walmsley | |
| 2007/0242829 A1* | 10/2007 | Pedlow, Jr. .................... | 380/277 |
| 2007/0263864 A1* | 11/2007 | Buchen et al. ............... | 380/201 |
| 2009/0086970 A1* | 4/2009 | Kahn ............................. | 380/211 |

OTHER PUBLICATIONS

Atmel Corporation, International Search Report and the Written Opinion of the corresponding PCT Application No. PCT/US2008/085747 mailed Jan. 28, 2009.
Result of the prior art search performed Sep. 13, 2007, 4 pages.
US 2010/0122095 A1, 05/2010, Jones et al. (withdrawn)*

* cited by examiner

Primary Examiner — Shin-Hon Chen
(74) Attorney, Agent, or Firm — Fish & Richardson P.C.

(57) ABSTRACT

Software can be downloaded securely using a multi-encryption method, where the decryption is completed when the software is executed. In one aspect, a multi-encrypted data item is received. One or more of the encryptions on the multi-encrypted data item is decrypted, yielding a partially decrypted data item. The partially decrypted data item is stored in a reserved portion of a storage medium. The partially decrypted data item is fetched from the storage medium and decrypted to yield the data item. The decryption can be performed using one or more circuits that implement multiple decryption processes, including multiple algorithm-key combinations.

18 Claims, 7 Drawing Sheets

SECURE SOFTWARE DOWNLOAD

TECHNICAL FIELD

This specification relates generally to information management.

BACKGROUND

In numerous embedded systems as well as many security tokens, such as smart cards (e.g., Subscriber Identity Module (SIM) cards in cell phones, subscriber cards for set top boxes, etc.) or Universal Serial Bus (USB) keys, software can be remotely downloaded to devices already installed in the field. The purpose of such downloads can be to update existing embedded software or to add or modify device functionality. As such, new software and/or other content can be downloaded to memory within a target device through an interface device, or other standard device communication interface.

During transmission of the downloaded software to the target device, the software may be exposed to a potential eavesdropper. To prevent eavesdropping, the downloaded software can be encrypted before it is transmitted to the device and then decrypted inside the device at reception. The decryption occurs before the software is stored in memory. Thus, the downloaded software is fully decrypted when stored in the memory and accessible to be executed on demand at a later time. While the encryption can protect the downloaded software from eavesdropping during the transmission, malicious software embedded in the target device can wait until the software is decrypted and stored in the memory before launching a Trojan horse or memory dump attack. Thus, the downloaded software is still vulnerable to attack, despite the pre-transmission encryption.

SUMMARY

Software can be downloaded securely using a multi-encryption method, where the decryption is completed when the software is executed. In one aspect, a multi-encrypted data item is received. One or more of the encryptions on the multi-encrypted data item is decrypted, yielding a partially decrypted data item. The partially decrypted data item is stored in a reserved portion of a storage medium. The partially decrypted data item is fetched from the storage medium and decrypted to yield the data item. The decryption can be performed using one or more circuits that implement multiple decryption processes, including multiple algorithm-key combinations.

Particular embodiments of the subject matter described in this specification can be implemented to realize one or more of the following advantages. Downloaded software is encrypted and protected up to execution time. Downloaded software is made less vulnerable to Trojan horse attacks or memory dumps at the target device. Downloaded software can be protected using any of multiple combinations of encryption algorithms and keys.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Multi-Encrypted Data Download

Figure 1:
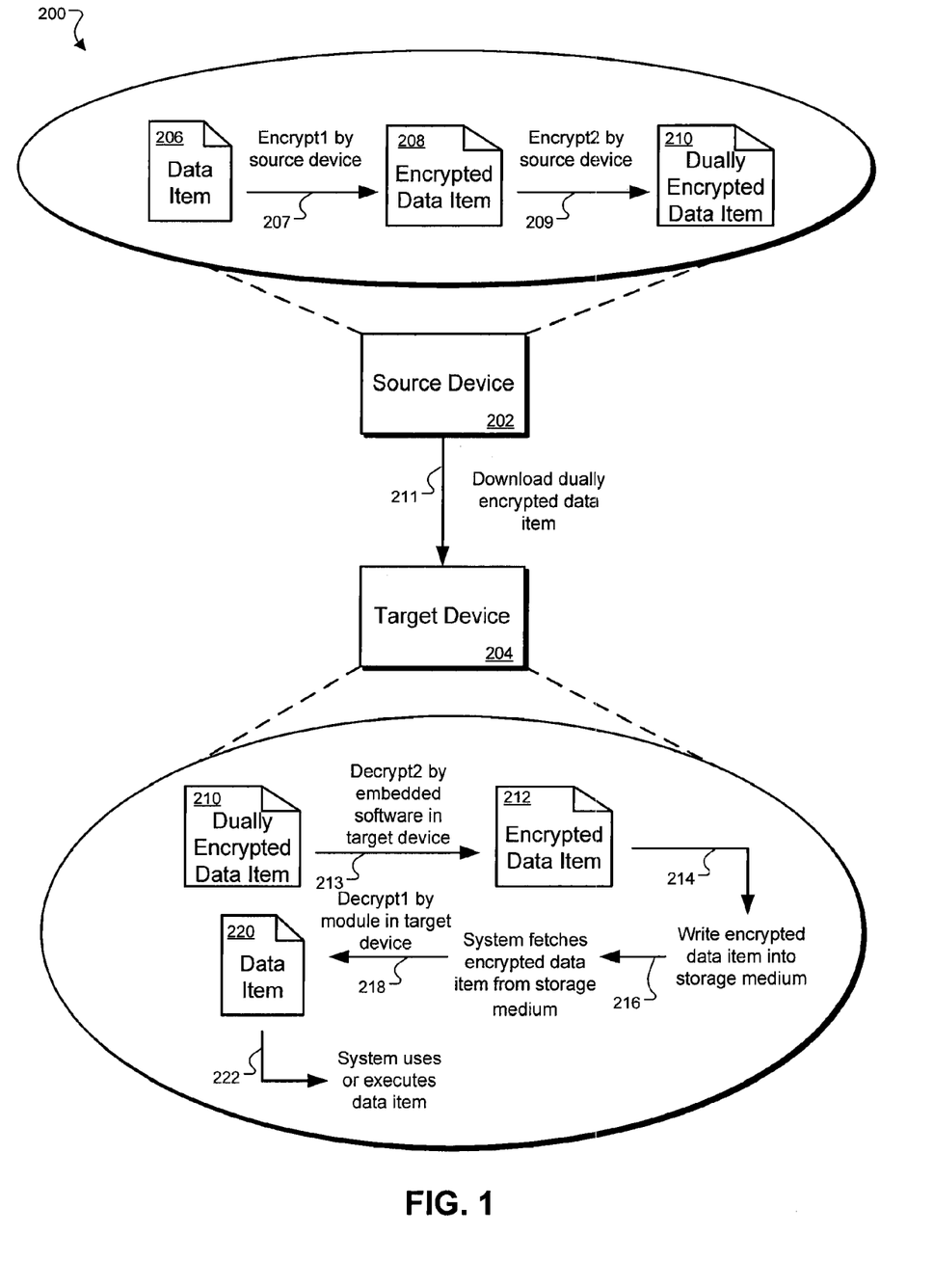
FIG. 1 is a block diagram illustrating a system for downloading software from a source device to a target device using a dual encryption method.

FIG. 1 is a block diagram illustrating a system 200 for downloading data items (e.g., software) from a source device to a target device using a multi-encryption method. System 200 can be operable to download, for example, system upgrades or updates, new functionality, modified functionality, other system features, or other data, information, or content. For example, system 200 can upload a new version of software that can provide bug fixes for equipment in the field. In general, one or more data items can be transmitted from a source device to a target device.

System 200 operates to protect the download of data items by preventing eavesdropping and extraction of data items in the downloaded software content. In particular, system 200 can protect data items during storage as well as during transmission. For example, system 200 can store sensitive software in an encrypted state until the software is requested for use by an authorized system. As an example, if system 200 receives a request to execute stored software, an authentication step can be performed to determine whether the requester system is an authorized system. The authentication in this example system 200 can include a protection mechanism using hardware available in the system. For example, the authentication can include a selectable, hardwired algorithm and key combination inaccessible to the software. If the authentication is accepted, system 200 can decrypt the requested software at execution time.

In some implementations, system 200 provides a one-way mechanism built with existing system hardware. For example, the protection mechanism can be placed in a memory read path (e.g., available for fetch or retrieval) to deter unauthorized downloading of data (e.g., software). Thus, embedded software in system 200 may not encrypt new software using the same protection mechanism. Advantageously, an overwrite of existing software can be deterred. For example, since the protection mechanism is placed in the memory read path, system 200 can prevent a "Trojan Horse" from installing rogue software within an unauthorized location.

In some implementations, system 200 includes a source device 202 and a target device 204. The source device 202 can, for example, be implemented as a set-top box, a computer, a handheld computer, a personal digital assistant, a cellular telephone, a network appliance, a camera, a smart phone, or other electronic device, or a combination of any two or more of these data processing devices or other data processing devices. The target device 204 can, for example, be implemented as a smart card, a SIM card, a USB key, a subscriber card, or other media capable of receiving and storing data. In operation, the source device 202 can be communicatively coupled to target device 204. The coupling can be wireline or wireless. For example, the source device 202 and target device 204 can be communicatively coupled over a wired cable, or wirelessly over radio frequency (RF) channels, or the Internet. Data (e.g., data items) can be transferred over the communicative coupling.

The source device 202 can include circuitry and software to encrypt and store data items. Source device 202 can also include processors, network interfaces, authentication software, and other ports for connecting with or viewing items on device 202. For example, source device 202 can include operating system software and application software which can be utilized by a CPU to perform source to target device communications (e.g., authorization, version checking, download control, etc.).

The target device 204 can include circuitry and software to decrypt and store data items. In some implementations, target device 204 can store any number of decryption keys and algorithms for decoding or decrypting received data items. In general, various keys and algorithms can be used for a single target device (e.g., smart card, SIM card). Further, multiple cards can potentially be configured with differing security arrangements. Thus, multiple keys and algorithm security arrangements can be embodied on the same device. In some implementations, the multiple configurations can be installed during the manufacturing process.

The target device 204 can implement one of a number of keys and algorithms. In one example, the device 204 can be programmed to select a particular algorithm and key combination to decrypt a data item. In some implementations, the manufacturing process can include hardwiring one or more decryption algorithm. For example, algorithms can be implemented in gates on transistors within the target device 204 circuitry. Decryption keys can be installed into the target device 204 and programmed into memory before the device is shipped (e.g., installed by a foundry, distributor, packager, system integrator, etc.). For example, each of a batch of target devices 204 can have an encrypted instance of the software that is determined before the device is shipped or integrated into another device. For each implementation of the device, several algorithms may be implemented, but one algorithm is selected for use. As a result, physically identical target devices can be encrypted with distinctly different algorithms. In an alternative implementation, various target devices can use an identical encryption algorithm, but implement distinctly different keys.

The encryption algorithms can include symmetric key algorithms (e.g., private key cryptography), asymmetric key algorithms (public key cryptography), elliptic encryption, translation tables, hash functions, or other cipher methods. In some implementations, the algorithms generally include a key to decrypt the encrypted data. In a symmetric key algorithm (e.g., DES and AES), the sender and receiver set up a shared key set up in advance and keep the key secret from all other parties. In an asymmetric key algorithm (e.g., RSA), there are two separate keys. For example, a public key is published and enables any sender to perform encryption and a private key is kept secret by the receiver and enables the receiver to perform correct decryption.

Implemented encryption algorithms can include keys with varying degrees of cryptographic strength. Cryptographic keys can include, but are not limited to private signature keys, public signature verification keys, symmetric authentication keys, private authentication keys, public authentication keys, symmetric data encryption keys, symmetric key wrapping keys, symmetric and asymmetric random number generation keys, and others.

In operation, system 200 can be used to download a data item, and decrypt the received data items at execution time. Moreover, the data items can remain encrypted until requested. For example, encrypted data items can be stored in one or more storage mediums until a target device requests the data item. Upon receiving the request, the target device can decrypt and execute the data item. One advantage system 200 provides is that the data items are not accessible when stored in memory or a storage medium because the decryption occurs right before the data item is executed. As such, the system 200 protects against a hacker that may access a memory in system 200 to read downloaded code that is not encrypted.

Turning to the illustrated system 200, source device 202 can include a data item 206. The data item 206 can be received from a service provider, a set-top box manufacturer, a computer, an in-person upload, or other third party provider. The data item 206 can include software and/or software patches, system data, security information, executable programs, data for use by applications, electronic media content, or any other downloadable content.

The source device 202 performs a first encryption on the data item 206 (arrow 207). The first encryption can yield an encrypted data item, such as data item 208. In some implementations, the first encryption can be performed to secure content or location information for the content within the target device. For example, the first encryption can encrypt data content and indexing information for programming the data content on target device 204. In some implementations, the indexing information may not be encrypted.

The source device 202 applies a second encryption to the encrypted data item 208 (arrow 209). The second encryption can yield a dually encrypted data item 210. In some implementations, the second encryption can be performed to protect the communication transfer between the source device 202 and the target device 204. For example, the second encryption may be an authentication step to ensure the encrypted data file 208 is not intercepted and modified, or "spoofed" before the file 208 is received in target device 204. Additional encryption steps can be added as desired.

Next, the dually encrypted data item 210 is transferred (e.g., downloaded) from the source device 202 to target device 204 (arrow 211). The dually encrypted data item 210 is received in target device 204 and decrypted by the embedded software in the target device 204. The decryption yields an encrypted data item 212 (arrow 213). In particular, the decryption at 213 can decode the authentication encryption performed in decryption 209 above.

After the first decryption 213, the target device 204 can write the encrypted data item 212 into device memory or a storage medium, such as non-volatile memory (NVM) (e.g., Flash memory, EEPROM memory) (arrow 214). At some point, embedded software in target device 204 may request a download of at least a portion of the encrypted data item 212 (arrow 216). As such, the target device 204 fetches the encrypted data item from device memory and decrypts the data item 212 using decryption circuitry in the target device 204 (arrow 218). The decryption circuitry will be described in relation to FIGS. 3A-7 below.

Decrypting the encrypted data item 212 yields the original data item 206 along with any encryption or decryption keys, indexes, or instructions. The resulting content is data item 220. Upon completion of the decryption, the target device 204 can use or execute the data item contents 220 (arrow 222). For example, the data item 220 may include software patches, upgrades, or other media usable on target device 204.

In some implementations, a dually encrypted data item 210 can be transferred from the source device 202 to the target device 204 using a removable storage medium. For example, the dually encrypted data item 210 is copied to a removable storage medium (e.g., a Flash memory stick or memory card, a removable disk) at the source device 202. The removable storage medium is then communicatively coupled to the target device 204 (e.g., through a Universal Serial Bus (USB) port, through a memory card reader, through a removable disk drive). The target device 204 reads the dually encrypted data item 210 from the removable storage medium and copies the dually encrypted data item 210 to the target device 204.

Secure Software Download Flow

Figure 2:
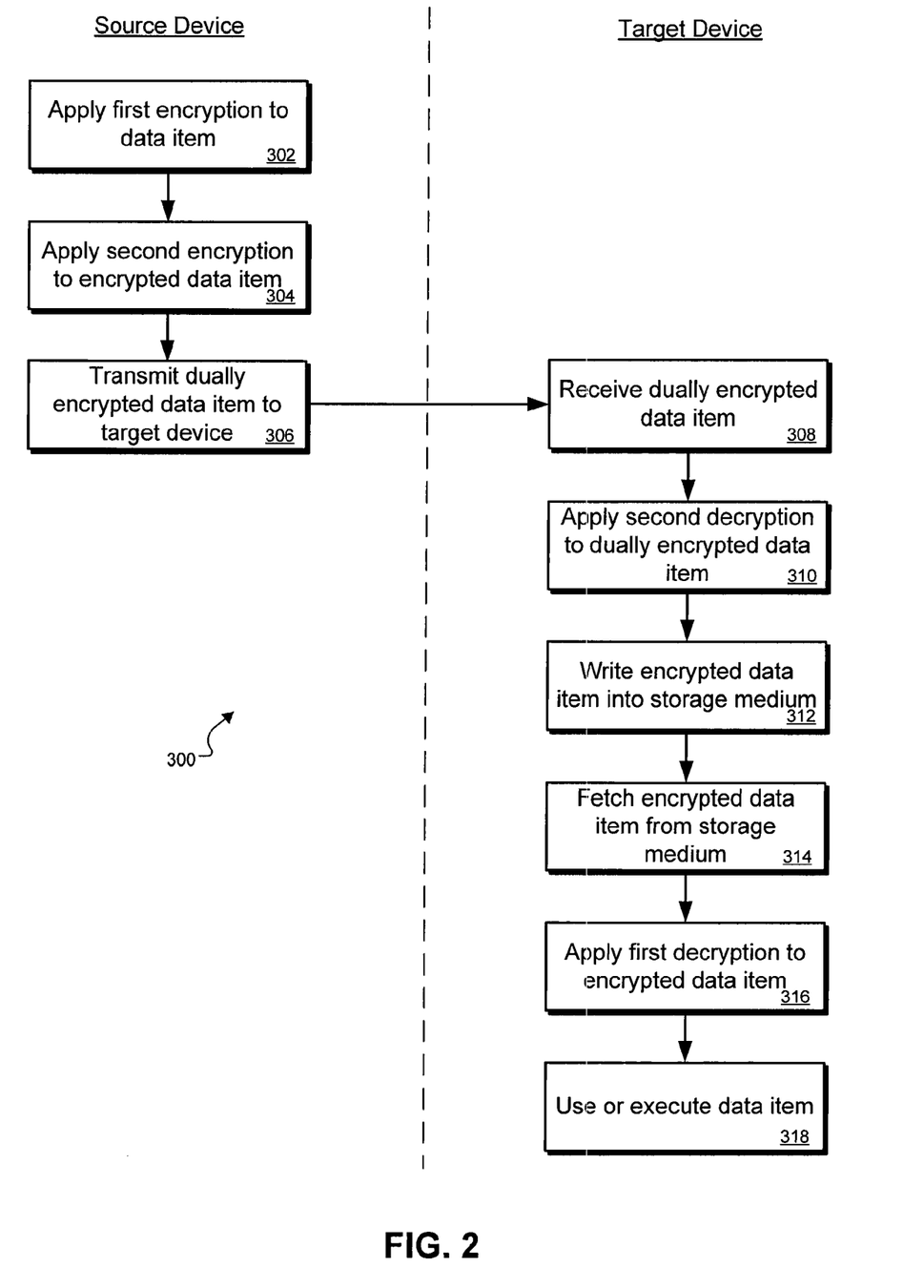
FIG. 2 is a flow diagram illustrating an example process for securely downloading software to a target device.

FIG. 2 is a flow diagram illustrating an example process 300 for securely downloading software to a target device. The process 300 includes operations (302-306) performed by the source device 202 and operations (308-318) performed by the target device 204, for example. In general, the process 300 includes multi-encrypting (e.g., dually encrypting) data items and applying a software and hardware decryption technique to fetch one or more multi-encrypted data items. It should be appreciated that while process 300 is described below with reference to dually encrypted data items, process 300 is applicable and adaptable more generally to multi-encrypted data items.

The process 300 begins with applying a first encryption to a data item (302). The first encryption can yield an encrypted data item, such as data item 208. The source device 202 next applies a second encryption to the encrypted data item (304). The second encryption can yield a dually encrypted data item, such as data item 210. The dually encrypted data item is then transferred to the target device (306). The target device 204 receives the dually encrypted data item (308).

After receiving the dually encrypted data item, the target device 204 applies the second decryption to the dually encrypted data item 210 (310). The decryption can yield encrypted data item 212. The encrypted data item 212 is then written to a reserved portion of a storage medium on device 204 until requested by target device 204, or another external system (312).

At some point, the encrypted data item 212 may be requested by the target device 204. For example, device 204 may perform a routine check for software upgrades and may discover item 212 sitting in a system storage medium. The target device 204 fetches the encrypted data item 212 from the storage medium (314). After fetching the item 212, the first decryption is applied to the encrypted data item (316). The decryption can yield the data item 220, for example. Upon completion of the decryption, the target device 204 uses or executes the data item (318).

Architectures for Secure Download

Figure 3A:
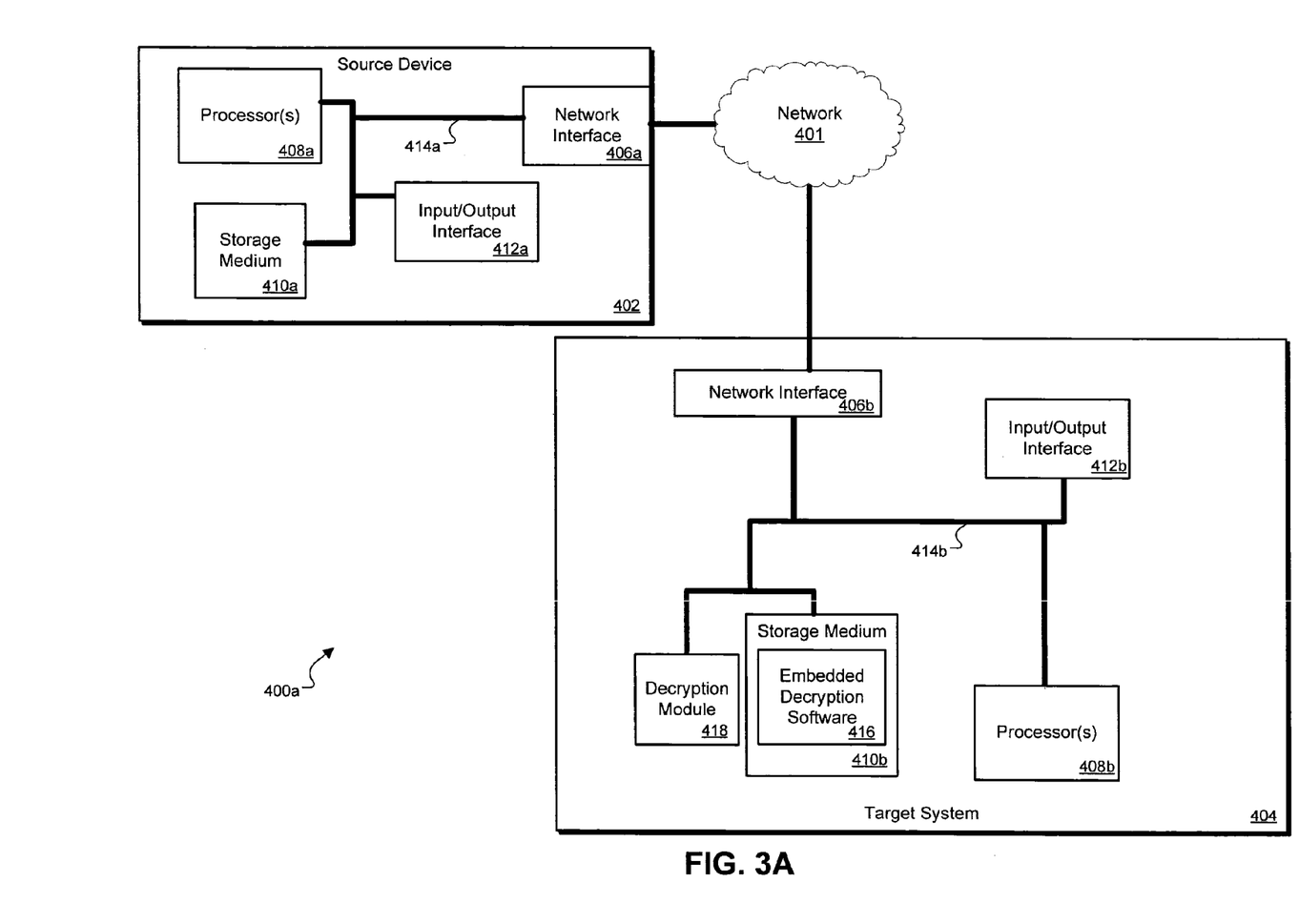
FIGS. 3A-3B illustrate block diagrams of an example architecture used to securely download software to a target device.
Figure 3B:
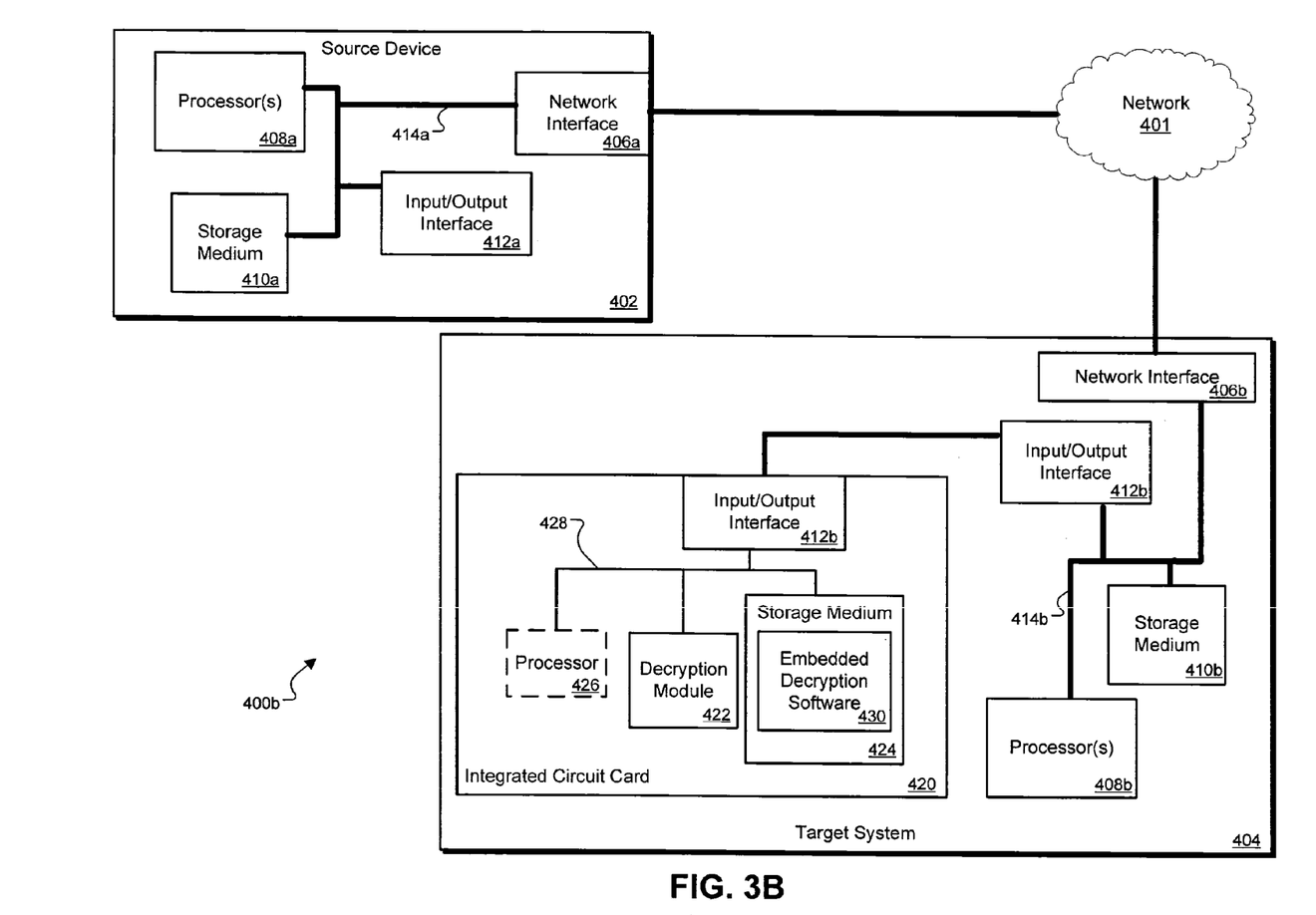

FIGS. 3A-3B illustrate block diagrams of example architectures 400a-b that can be used to securely download software to a target device. In some implementations, the architectures 400a-b can be used to download software content from a source device to a target device. In general, portions of architectures 400a-b may be used in the downloading methods described in this disclosure.

It should be apparent that the architecture shown in FIGS. 3A-3B include merely one example of an architecture for the systems described in this disclosure, and more or fewer components than shown can be utilized, or a different configuration of components can be used. The various components shown in FIGS. 3A-3B can be implemented in hardware, software, or a combination of hardware and software, including one or more signal processing and/or application specific integrated circuits. Further, it should be appreciated that while architectures 400a-b are described below with reference to dually encrypted data items, architectures 400a-b are applicable and adaptable more generally to multi-encrypted data items.

Referring to FIG. 3A, the architecture 400a includes a source device 402 and a target system 404 connected via network interface 406. The source device 402 can, for example, be implemented as a set-top box, a computer, a handheld computer, a personal digital assistant, a cellular telephone, a network appliance, a camera, a smart phone, or other electronic device, or a combination of any two or more of these data processing devices or other data processing devices. The target system 404 can, for example, be implemented as a set-top box, a computer, a handheld computer, a personal digital assistant, a cellular telephone, a network appliance, a camera, a smart phone, or other electronic device, or other data processing device. In some implementations, source device 402 is an implementation of source device 202 and target device 404 is an implementation of target device 404.

The source device 402 and the target system 404 both include network interfaces 406a-b, processors 408a-b, storage media 410a-b, and input/output interfaces 412a-b. Each of the components 406a-b, 408a-b, 410a-b, and 412a-b are interconnected within each respective device 402 and 404, using a system bus 414a-b. Network interface 406a connects source device 402 to the network interface 406b in target system 404. The processors 408a and 408b are capable of processing instructions for execution within respective systems 402 and 404. In some implementations, the processors 408a and 408b are single-threaded processors. In some other implementations, the processors 408a and 408b are multi-threaded processors. The processors 408a and 408b are capable of processing instructions stored in the storage medium 410a or 410b to display graphical information for a user interface on the input/output interfaces 412a or 412b.

The storage media 410a and 410b store information within each respective system 402 and 404. In some implementations, the storage medium 410a and 410b are computer-readable media. In some implementations, the storage media 410a-b are volatile memory units. In some other implementations, the storage mediums 410a and 410b are nonvolatile memory units. In various different implementations, the storage media 410a and/or 410b is a floppy disk device, a hard disk device, an optical disk device, or a tape device.

As shown, the storage medium 410b includes an embedded decryption software module 416. The embedded decryption software module 416 can include instructions that can be executed by processor(s) 408b. In one example, the instructions generally include directives to decrypt a first encryption on a dually encrypted data item to yield an encrypted data item.

The target system 404 also includes a decryption module 418. The decryption module 418 can include circuitry capable of decrypting data files or program software received from source device 402, for example. Decryption module 418 is coupled to processor bus 414b via network interface 406b. In some implementations, the decryption module 418 can be included in target system 404 to perform a first decryption on received data.

The input/output interfaces 412a and 412b provide input/output operations in each respective system 402 and 404. In some implementations, the input/output interface 412a includes a keyboard and/or pointing device. In another implementation, the input/output interface 412a includes a display unit for displaying graphical user interfaces.

Now referring to FIG. 3B, the system 400b is again shown including the source device 402 and target system 404 connected via network interface 406. Similar to FIG. 3A, both devices 402 and 404 include network interfaces 406a-b, processors 408a-b, storage mediums 410a-b, and input/output interfaces 412a-b. Each of the components 406a-b, 408a-b, 410a-b, and 412a-b are interconnected within each respective device 402 and 404 via the system buses 414a and 414b. In some implementations, source device 402 is an implementation of source device 202 and target device 404 is an implementation of target device 404.

In the FIG. 3B example, the target system 404 additionally includes an installed integrated circuit card (ICC) 420. The ICC 420 can, for example, be implemented as a smart card, a SIM card, a USB key, a subscriber card, or other media capable of receiving and storing data. The ICC 420 can be programmable by target system 404, source device 402, or another device. The programmed information can be used to identify the target system 404 on a network, execute device functionality, or otherwise enable system 404 to operate.

The ICC 420 can be installed in target system 404. The ICC 420 can be removable and/or replaceable with a similar device or other device by a user. For example, a service operator may replace ICC 420 with a test device having more functionality for purposes of troubleshooting, upgrading, or repair. In some implementations, installation of ICC 420 in system 404 effectively inserts ICC 420 as a portion of one or more circuits in system 404. For example, when installed, ICC 420 can be connectively coupled to one or more signal lines within the target system 404. As shown, the ICC 420 is coupled to target system 404 through the input/output interface 412b. As such, the target system 404 may have access to a portion of information stored in ICC 420, for example.

ICC 420 includes one or more embedded integrated circuitry modules within the ICC 420. The embedded circuitry can be any circuitry capable of accessing target system 404 to decrypt received information. For example, the circuitry can be operable to access and exchange information with target system 404 through input/output interface 412b. In one example, the access can be performed to decrypt a previously stored encrypted data item. In some implementations, the ICC 420 can include a decryption key linked to a specific decryption device within target system 404.

As shown, the ICC 420 includes a decryption module 422, a storage medium 424, and optionally includes a processor 426. The decryption module 422, storage medium 424 and processor 426 are coupled to a processor bus 428 via the input/output interface 412b. In some implementations, the optional processor 426 can be included within decryption module 422. In some implementations, the ICC 420 may not include a processor, but may instead access processors 408b for direction.

The decryption module 422 includes circuitry capable of protecting and decrypting data files or program software received from source device 402. In general, the decryption module 422 can authorize the target system 404 to decrypt content on the ICC 420 by verifying an appropriate encryption key matches a particular decryption algorithm, thereby making it more difficult to decrypt data on any device other than an authorized device. In some implementations, the decryption module 422 is a system for reading data from a protected storage medium 424, for example. In general, the decryption module 422 can function as a decryption device when the decryption key is retrieved from the storage medium 424.

In operation, the decryption module 422 can read the decryption key from ICC 420 and determine whether the decryption key is acceptable (e.g., forms a matched key and algorithm combination) for target system 404. If the decryption key matches the encryption algorithm on the ICC 420, the module 422 can decrypt data from the protected ICC 420 prior to providing it to the target system 404.

In some implementations, the decryption module 422 can serve to provide a hardware decryption module with an industry standard interface (such as PCMCIA or USB) that can be embedded in the circuitry of a host, or plugged into an interface of the host. In particular, the module 422 can perform the actual data or media decryption function using a supplied encrypted key to initialize the decryption circuitry.

The storage medium 424 includes embedded decryption software 430. The decryption software 430 can execute instructions stored in the storage medium 424. The instructions can be configured for execution by the one or more processors 408b, or 426, for example. The instructions generally include directives to decrypt a first encryption on a dually encrypted data item to yield an encrypted data item. In some implementations, ICC 420 can employ one or more circuits (e.g., decryption module 422) in combination with embedded decryption software 430 to decrypt the encrypted data item, to yield the original data item.

In one example, system 400 can be operational to transmit encrypted data content and software from the source device 402 to the installed ICC 420 over network interface 406. In particular, software (e.g., data files and program software) can be downloaded from source device 402 to the installed ICC 420. The downloaded information can be decrypted using a combination of embedded decryption software 430 and decryption module circuitry 422, for example.

In some implementations, a portion of the ICC 420 circuitry is included on target system 404, rather than included wholly in the installed ICC 420. For example, the decryption module 422 can be located in target system 404, while the embedded decryption software 430 remains on ICC 420. In other implementations, the decryption module 422 circuitry can be combined with circuitry in target system 404 to make the system 404 operable to an end user.

In some implementations, target system 404 includes an active shield (not shown). The active shield can provide security to device 404 circuitry and software by detecting a short circuit if the tampering has occurred on the device (e.g., opening the device). The active shield can be used to prevent focused ion beam modification or micro-probing, for example.

The features described above can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor or programmable target device coupled to receive data and instructions from, and to transmit data and instructions to, a data storage system, at least one input device, and at least one output device.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN, and the computers and networks forming the Internet.

Example Secure Download

Figure 4:
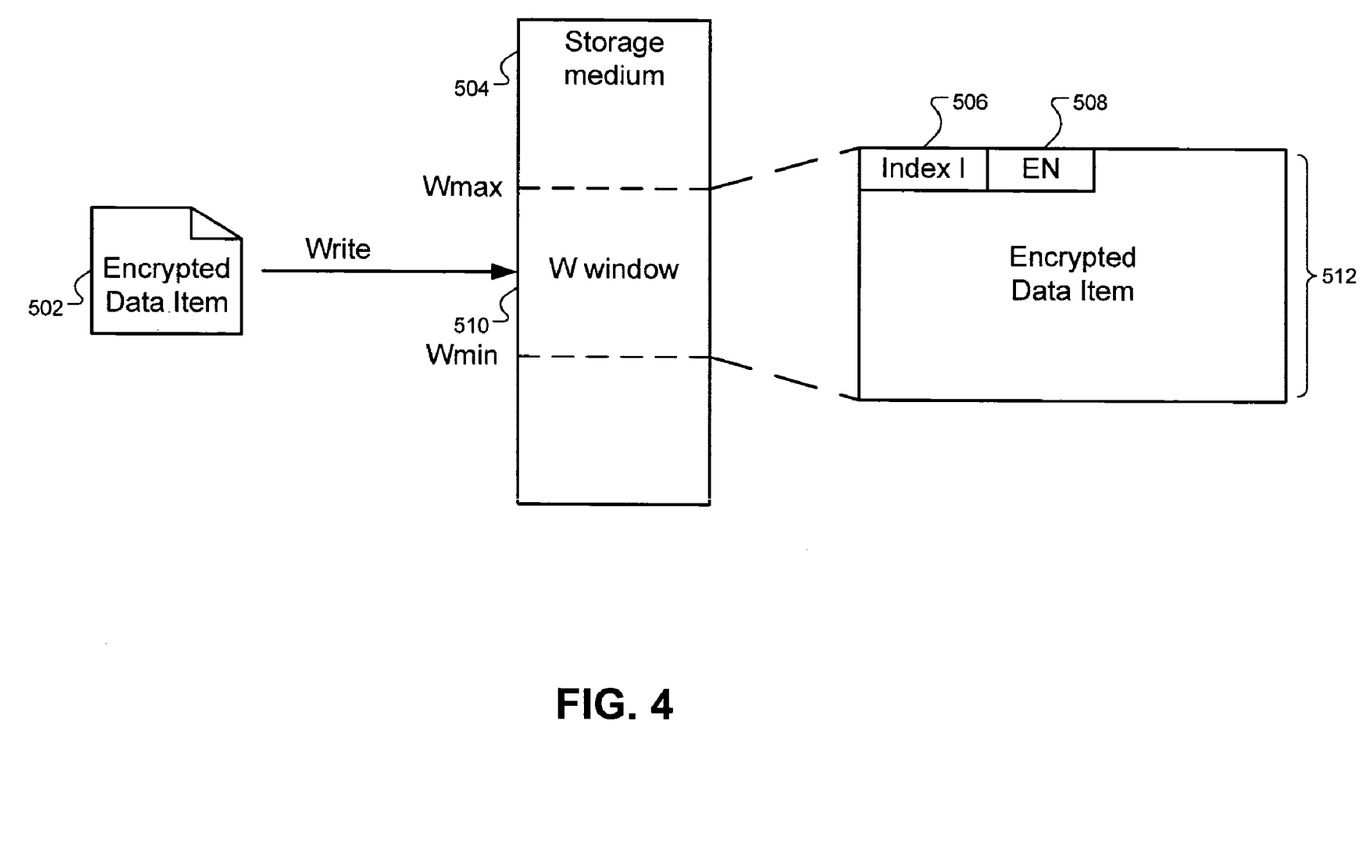
FIG. 4 is a block diagram of an example of a secure download to a target device.

FIG. 4 is a block diagram illustrating an example of a secure download to a target device. The download generally includes storing an encrypted data item 502 (which can be encrypted using one or more encryption steps) in a storage medium 504 with an index (I) 506 and an enable bit (EN) 508. The encrypted data item 502 can include encrypted software patches, system data, security information, or other downloadable content.

The storage medium 504 can be nonvolatile memory (NVM), random access memory (RAM), or read-only memory (ROM). In this example, the storage medium 504 includes a protected memory window (W) 510 where the encrypted data item 502 is stored. The window 510 is depicted with an upper limit (Wmax) and a lower limit (Wmin). The upper limit and the lower limit can be expressed as addresses in the storage medium. Thus, the upper limit and the lower limit can define a range of addresses in the storage medium that make up the protected memory window 510; the window 510 defines a reserved portion of the storage medium. The window 510 can store some or all encrypted software received from a source device 402, for example. In some implementations, storage medium 504 includes multiple, non-overlapping protected memory windows, each with its own upper and lower limits.

The index (I) 506 can be used to select one of any number of algorithm and key combinations used to decrypt the encrypted data item 502. For example, the index 506 can be used by system hardware to select a suitable algorithm and key combination for particular software. In some implementations, the index 506 may represent an integer value corresponding to an algorithm and key combination. In some implementations, the index 506 may correspond to the location of the algorithm and key combination.

One or more enable bits 508 can be used to indicate whether a protection mechanism (e.g., a hardware decryption mechanism) using the algorithm and key combination is enabled or disabled for the particular download area. For example, a single enable bit 508 can be used by system hardware to enable or disable the protection mechanism. In this example, the download area is within the protected window 510. Thus, the enable bit 508 indicates the protection mechanism is enabled. In other words, the enable bit 508 indicates a data protection status of software downloaded into the download area. If the protection mechanism is enabled, then the data protection status is positive. Otherwise, the data protection status is negative.

The index 506 of the algorithm and key combination and the enable bit 508 can be concatenated with the encrypted data item 502 to create a memory structure 512. After concatenation, the memory structure 512 can be written to specific address locations in the protected window 510. In some implementations, the address locations of the protected window 510 are known by the hardware of the target device 416, for example, as well as the developer of the software to download. In some implementations, the index value 506 and the enable bit value 508 are concatenated to the beginning or end of the window 510.

Decryption System Schematic

Figure 5:
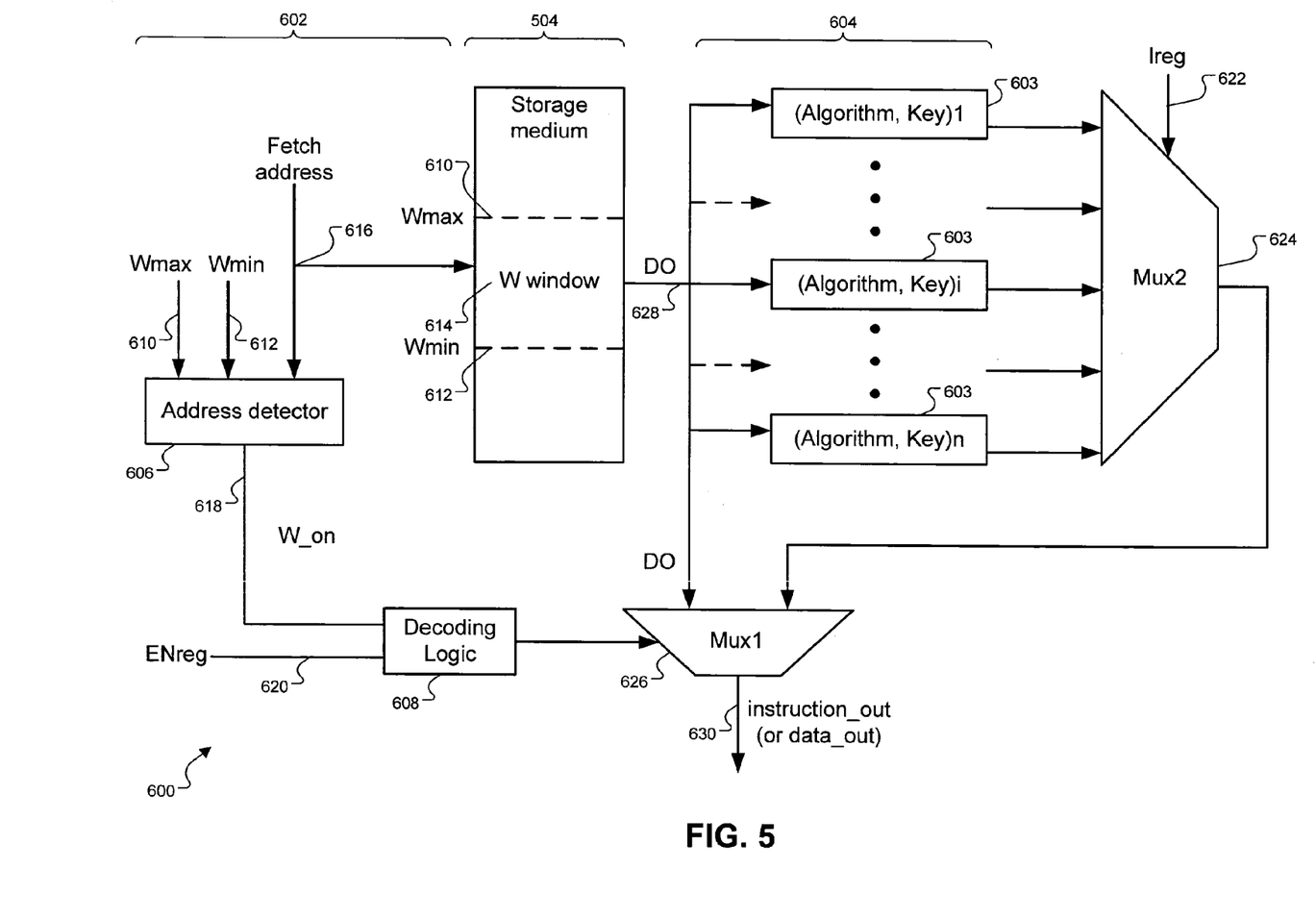
FIG. 5 is an example system illustrating a schematic representation of multiple algorithm and key combinations implemented around a nonvolatile memory block.

FIG. 5 is an example system 600 illustrating a schematic representation of multiple algorithm and key combinations implemented around a nonvolatile memory block. The system 600 is configured to enable or disable a hardware decryption mechanism. For example, system 600 can enable the hardware protection mechanism to ensure an unauthorized user (e.g., a hacker) can not gain plain view access to downloaded data items stored in system memory. Thus, the protection mechanism can ensure that an unauthorized decryption of data is less likely to occur in the system 600.

The system 600 includes the storage medium 504, an address detector block 602, and an algorithm-key combination block 604. As described above, storage medium 504 can be NVM, RAM, ROM, or other types of memory, and can store encrypted data items, indices, and other data content.

The address detector block 602 includes an address detector 606 and decoding logic 608. In some implementations, decoding logic 608 is an AND gate. The address detector 606 can receive a Wmax limit 610 and a Wmin limit 612 to determine addresses within protected window 614. Further, the address detector 606 can detect whether a current fetch address 616 is located within the protected window 614. If the fetch address 616 is located within window 614, the address detector 606 can send a signal indicating such to decoding logic 608. For example, the address detector 606 can send a high signal (logic 1) on line W_on 618. If the fetch address 616 is not located within window 614, the address detector 606 can send a signal indicating such to decoding logic 608. For example, the address detector 606 can send a low signal (logic 0) on line W_on 618.

The decoding logic 608 (e.g., an AND gate) can receive the W_on signal 618 and an ENreg signal 620. The ENreg signal 620 can be an enable signal (e.g., high signal) or a disable signal (e.g., low signal). The ENreg signal 620 can be used to enable or disable the decryption mechanism in system 600. Upon receiving both signals 618 and 620, the decoding logic 608 can decode the W_on signal 618 and the ENreg signal 620. For example, if the decoding logic is an AND gate, the AND gate implements a logical conjunction of the W_on signal 618 and the ENreg signal 620.

In some other implementations, the decoding logic 608 can include other types of decoding logic in addition or in place of an AND gate.

The algorithm combination block 604 includes one or more algorithm and key combinations 603 (e.g., 1-N algorithm/key combinations). As shown in FIG. 5, multiple algorithm and key combinations 603 can be implemented concurrently in system 600. The algorithm and key combinations 603 provide a cryptographic mechanism for deterring eavesdropping and data extraction of content within window 614. The algorithm combination block 604 can decrypt a data item fetched from the storage medium 504 using each of the plurality of algorithm and key combinations 603 and output multiple outputs into a multiplexer block 624, with each output being a result of decrypting the fetched data item using one of the algorithm and key combinations 603.

In some implementations, one or more of the algorithm and key combination 603 can be configured to decrypt multiple steps of encryption (e.g., for a data item that is still multi-encrypted when fetched from the storage medium 504). For example, an algorithm and key combination 603 can implement a set of multiple algorithm and key combinations. The set of multiple algorithm and key combinations can be used to decrypt a multi-encrypted data item.

System 600 also includes a multiplexer block 624 and a multiplexer block 626. The multiplexers 624, 626 can select one of many analog or digital data sources in system 600 and can output that source into a single channel.

At some point, system 600 may experience a cold or a warm reset. The reset can invoke the hardware in system 600 to read the index (e.g., index 506) and the enable bit (e.g., EN 508) from the storage medium 504. The index value 506 can be stored into a digital register "Ireg" 622 and digital register ENreg 620. In some implementations, the IReg register 622 and the ENreg register 620 may not be readable or writeable by the embedded decryption software 424, for example, to ensure higher security in the system 600.

Operations in system 600 may begin with a system reset, a memory fetch, a software download, a user interaction, or other event. For example, the target device 404 can attempt to fetch a memory address in system 600. If the fetch address 616 is located within memory window 614, system 600 sets the W_On signal 618 high.

The multiplexer block 624 can select an output from one of the algorithm and key combinations 603, dependent upon the value stored in the Ireg register 622. For example, the Ireg register 622 can include data from a manufacturer that selects a particular algorithm and key combination. As such, the output resulting from applying the appropriate algorithm and key combination to a data item fetched from the storage medium 504 is selected by the multiplexer 624 and output to multiplexer 626.

The multiplexer block 626 can receive a data item (e.g., software) decrypted by the selected algorithm and key combination 603, a signal DO 628, and a signal from the decoding logic 608. The multiplexer 626 can determine to use signal DO 628 or the output of multiplexer 624 depending on the value stored in the ENreg register 620. For example, if the ENreg register is high and the fetch address is within window 614, the multiplexer block 626 can use the selected algorithm and key combination 603 to decrypt and output an instruction out (or more generally, data out) signal 630. In this example, the appropriate algorithm and key combination 603 is selected (by multiplexer block 624) and a decryption of the software can be performed using the selected algorithm and key combination 603.

In another example, the fetch address 616 can be located outside of memory window 614. In the event the fetch address 616 is outside of memory window 614, signal DO 628 can return the requested memory content thereby bypassing the decryption mechanism. The bypass is allowed since the content outside of memory window 614 in system 600 is unprotected. Similarly, if the W_on signal 618 is set low by detector 606, system 600 bypasses the decryption mechanism and provides the requested data content or encrypted data. In some implementations, if the W_on signal 618 is set low and the fetch address 616 is within memory window 614, the decryption mechanism may be activated since a read access was requested within the protected memory window 614.

In some implementations, the selected algorithm and corresponding key can be separately stored on a target system or an installed ICC 420. For example, N different algorithms can be fixed by hardware on a target system 404, while the key can be individually stored on the installed ICC 420 (e.g., during system manufacturing) in an area that is unreadable by embedded software, for example. As an advantage, the separate storage of algorithm and key can provide key diversification per device which further strengthens the power of the protection mechanism. In one example, a portion of the key can be fixed, while another portion of the key is programmable.

In some implementations, N algorithms can be fixed by hardware, but can include programmable portions. For example, an algorithm can include a number of changeable parameters dependent on the device. The parameters can be programmed by values downloaded in a particular target system. For example, stored algorithms can include customization parameters for creating a unique hardware programmable algorithm. The parameters can include lookup tables, hash tables, arithmetical coefficients, and such.

In some implementations, the storage medium 504 can have multiple protection windows 614. Each of these multiple protection windows can be associated with its own algorithm-key combination block 604, with one or more algorithm-key combinations, and corresponding Ireg and ENreg registers.

Figure 6:
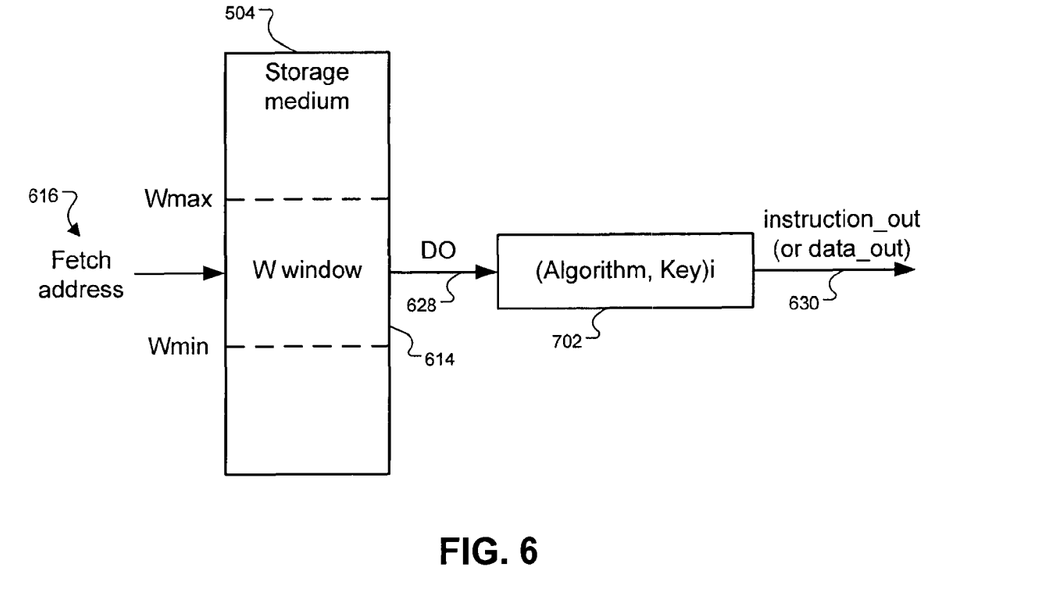
FIG. 6 is an example illustrating a simplified block diagram of the schematic shown in FIG. 5.

FIG. 6 is an example illustrating a simplified block diagram of the schematic shown in FIG. 5. In general, FIG. 6 is an equivalent diagram of FIG. 5 when the decryption mechanism is enabled (e.g., the ENreg register is set high thereby selecting "algorithm key combination i") 702, and further, the fetch address 616 is located in the protected memory window 614. The diagram in FIG. 6 is created when the multiplexer block 626 connects the multiplexer 624 output to the instruction out or data out signal 630. In addition, the multiplexer 624 output is generated by the multiplexer block 624. For example, the multiplexer block 624 selects "algorithm key combination i" output buses based on the Ireg value 622. As an example, if Ireg is equal to "2" the "algorithm key combination 2" output will be connected to the output of the multiplexer block 624. In some implementations, the enabled decryption mechanism 702 can decrypt multiple steps of encryption for a data item that had been encrypted using multiple encryption steps.

Figure 7:
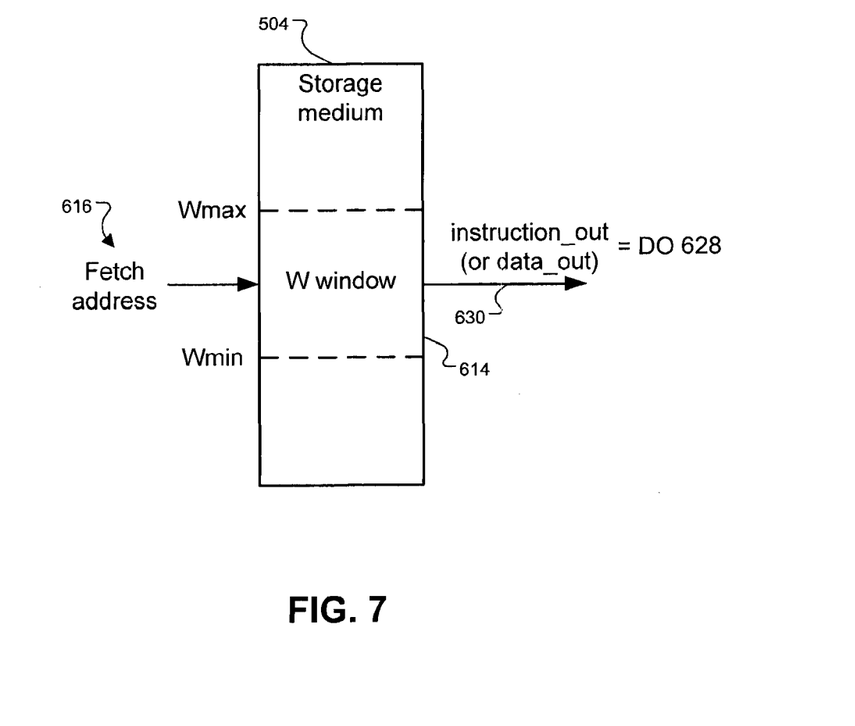
FIG. 7 is an example illustrating another simplified block diagram of the schematic shown in FIG. 5.

FIG. 7 is an example illustrating another simplified block diagram of the schematic shown in FIG. 5. In general, FIG. 7 is an equivalent diagram of FIG. 5 when the decryption mechanism is disabled (e.g., the ENreg register is set low) or if the fetch address 616 is located outside of the protected memory window 614. Thus, the decryption mechanism is disabled and the instruction out or data out signal 630 is equivalent to the DO signal 628.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   fetching a data item stored in a reserved portion of a storage medium;
   generating a plurality of candidate data items, each of the plurality of candidate data items being generated by applying a respective one of a plurality of decryption processes to the fetched data item;
   reading a value stored in the reserved portion of the storage medium with the data item, the value being selected prior to the generating, the value being independent from the fetched data item;
   using the value, selecting one from among the candidate data items and the fetched data item; and
   outputting the selected data item,
   wherein the method is performed by a data processing apparatus.

2. The method of claim 1, wherein a respective decryption process comprises one or more algorithm-key combinations.

3. The method of claim 1, wherein selecting one from among the candidate data items and the fetched data item comprises:
   selecting one from among the candidate data items if one or more criteria are satisfied; and
   selecting the fetched data item if any of the criteria are not satisfied.

4. The method of claim 3, wherein the criteria comprises:
   that the fetched data item was fetched from the reserved portion of the storage medium; and
   that a data protection status for the fetched data item is positive.

5. The method of claim 4, wherein the data item is stored in the reserved portion of the storage medium, the method further comprising, before the fetching, receiving a request for the data item, the request for the data item comprising a fetch address identifying an address in the reserved portion of the storage medium where the data item is stored; and
   wherein fetching the data item comprises fetching the data item from the fetch address.

6. The method of claim 3, wherein selecting one from among the candidate data items comprises:
   identifying a decryption process associated with the fetched data item from the plurality of decryption processes; and
   selecting a respective candidate item that is a result of applying the identified decryption process to the fetched data item.

7. A method, comprising:
   receiving a multi-encrypted data item, the multi-encrypted data item having one or more first encryptions applied to an encrypted data item, the encrypted data item having one or more second encryptions applied to a data item;
   decrypting the first encryptions on the multi-encrypted data item to yield the encrypted data item; and
   storing the encrypted data item in a portion of a storage medium;
   fetching the encrypted data item from the portion of the storage medium; and
   decrypting the second encryptions on the fetched encrypted data item to yield the data item, where decrypting the second encryptions includes:
      generating a plurality of candidate data items, each of the plurality of candidate data items being generated by applying a respective one of a plurality of different decryption processes to the fetched encrypted data item;
      reading a value stored in the portion of the storage medium with the encrypted data item the value being selected prior to the generating, the value being independent from the fetched encrypted data item;
      using the value, selecting one from among the candidate data items and the fetched encrypted data item; and
      outputting the selected data item,
   wherein the method is performed by a data processing apparatus.

8. The method of claim 7, further comprising storing in the reserved portion of the storage medium, data identifying one or more of a plurality of decryption algorithm-key combinations, the identified algorithm-key combinations corresponding to second encryptions.

9. The method of claim 8, wherein decrypting the second encryptions comprises:
   decrypting the second encryptions using the plurality of algorithm-key combinations, yielding the plurality of candidate data items; and
   selecting a candidate data item of the plurality of candidate data items corresponding to the identified algorithm-key combinations.

10. An apparatus, comprising:
    a storage medium, the storage medium operable to store a data item;
    one or more first circuits operable to receive the data item and generate a plurality of candidate data items from the received data item by applying each of a plurality of decryption processes to the received data item, wherein each candidate data item is a result of an application of a respective decryption process of the plurality of decryption processes to the received data item; and
    one or more second circuits operable to read a value stored in a reserved portion of a storage medium with the data item and select, using the value, one from among the candidate data items and the received data item and output the selected data item, where the value is selected prior to the generating, the value being independent from the received data item.

11. The apparatus of claim 10, wherein a respective decryption process comprises one or more algorithm-key combination, each algorithm-key combination comprising a decryption key and a decryption algorithm.

12. The apparatus of claim 11, wherein at least a portion of each of the decryption processes is hardwired into the one or more first circuits.

13. The apparatus of claim 11, wherein at least a portion of the decryption key is programmable.

14. The apparatus of claim 11, wherein a decryption algorithm in a respective algorithm-key combination is programmable using one or more parameters.

15. The apparatus of claim 10, wherein the storage medium is further operable to store data identifying one of the plurality of decryption processes and a data protection status indicator.

16. The apparatus of claim 15, wherein the one or more circuits operable to select one from among the candidate data items and the received data item are operable to:
   select a respective one of the candidate data items corresponding to the identified decryption process if the data protection status indicator indicates that the data protection status is positive and if the received data item is received from the reserved portion of the storage medium; and
   select the received data item if the data protection status indicator indicates that the data protection status is negative or if the received data item is not received from the reserved portion of the storage medium.

17. A system comprising:
one or more processors;
a storage medium;
a decryption module operable to decrypt encryption using any of a plurality of decryption algorithm-key combinations; and
instructions stored in the storage medium and configured for execution by the one or more processors, the instructions comprising instructions to:
   receive a multi-encrypted data item, the multi-encrypted data item having one or more first encryptions applied to an encrypted data item, the encrypted data item having one or more second encryptions applied to a data item;
   decrypt the first encryptions on the multi-encrypted data item to yield the encrypted data item; and
   store the encrypted data item in a portion of a storage medium;
   fetch the encrypted data item from the portion of the storage medium; and
   decrypt the second encryptions on the fetched encrypted data item to yield the data item, where decrypting the second encryptions includes:
   generating a plurality of candidate data items, each of the plurality of candidate data items being generated by applying a respective one of a plurality of different decryption processes to the fetched encrypted data item;
   reading a value stored in the portion of a storage medium with the data item, the value being selected prior to the generating, the value being independent from the fetched encrypted data item;
   using the value, selecting one from among the candidate data items and the fetched encrypted data item; and
   outputting the selected data item.

18. A system comprising:
means for receiving a multi-encrypted data item, the multi-encrypted data item having one or more first encryptions applied to an encrypted data item, the encrypted data item having one or more second encryptions applied to a data item;
means for decrypting the first encryptions on the multi-encrypted data item to yield the encrypted data item; and
means for storing the encrypted data item in a portion of a storage medium;
means for fetching the encrypted data item from the portion of the storage medium; and
means for decrypting the second encryptions on the fetched encrypted data item to yield the data item, where decrypting the second encryptions includes:
   generating a plurality of candidate data items, each of the plurality of candidate data items being generated by applying a respective one of a plurality of different decryption processes to the fetched encrypted data item;
   reading a value stored in the portion of the storage medium with the encrypted data item, the value being selected prior to the generating, the value being independent from the fetched encrypted data item;
   using the value, selecting one from among the candidate data items and the fetched encrypted data item; and
   outputting the selected data item.

* * * * *

UNITED STATES PATENT AND TRADEMARK OFFICE
CERTIFICATE OF CORRECTION

PATENT NO.        : 8,213,612 B2                          Page 1 of 1
APPLICATION NO.   : 11/952880
DATED             : July 3, 2012
INVENTOR(S)       : Majid Kaabouch et al.

It is certified that error appears in the above-identified patent and that said Letters Patent is hereby corrected as shown below:

Column 14, Line 33:

In claim 7, delete "item" and insert -- item, --.

Signed and Sealed this
Eighth Day of January, 2013

David J. Kappos
*Director of the United States Patent and Trademark Office*